M. L. KEEN.
Distilling Coal Tar and other Hydrocarbons.
No. 25,552.
Patented Sept. 20, 1859.
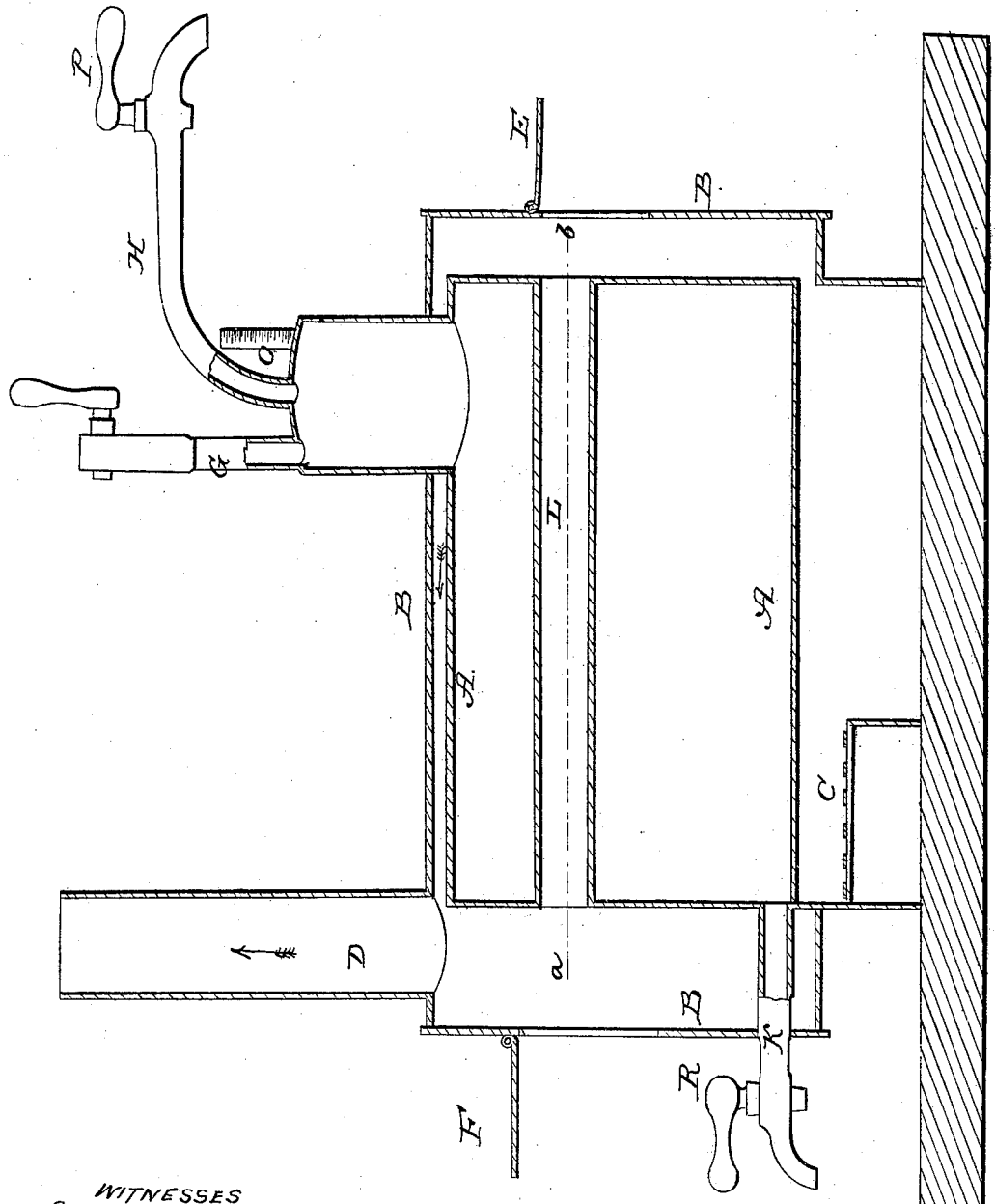

UNITED STATES PATENT OFFICE.

MORRIS L. KEEN, OF ROYER'S FORD, PENNSYLVANIA.

IMPROVED MODE OF DISTILLING LIQUIDS FROM COAL-TAR.

Specification forming part of Letters Patent No. 25,552, dated September 20, 1859.

*To all whom it may concern:*

Be it known that I, MORRIS L. KEEN, of Royer's Ford, in the county of Montgomery and State of Pennsylvania, have invented certain new and useful improvements in the process of distilling coal-tar and other similar hydrocarbons for the manufacture of pitch and oils; and I do hereby declare that the following is a full, clear, and exact description of the same, reference being had to the accompanying drawing, which represents a longitudinal vertical section through the apparatus which I use in my process.

Great difficulties have been experienced heretofore in the distillation of coal-tar by reason of the slow process which had to be employed in volatilizing the watery constituents, ammoniacal liquor, and light oils, owing to the rising on the surface of the tar in the early stages of the process of a tarry foam, requiring great attention and a slow fire to prevent said foam from overrunning the still and endangering the premises by fire.

The object of my invention is to facilitate the above-described operation and to perform it in a comparatively short time by means of a strong fire without endangering the operatives or the premises; and my invention consists in heating the material to be distilled in a steam-tight boiler under pressure to such a temperature as will destroy the tarry foam, when the volatile substance will easily be expelled by the action of the heat. I find a pressure of from forty to fifty pounds to the square inch answers very well in early stages of the process, which is gradually diminished to the end of the work; but I do not confine myself to any fixed pressure.

To enable others skilled in the art to make and use my invention, I will proceed to describe the construction and operation of the mechanism by which I have carried it out.

A represents a cylindrical boiler secured within a furnace, B.

C represents the fire-grate, and D the smoke-pipe. The furnace B is provided at both its ends with doors E and F, to clean the flues. The boiler is charged with the material to be distilled through the pipe G until the material reaches the line $a\,b$, or thereabout.

H is a stop-cock pipe, through which the volatile substances pass in the form of gases into the condensing apparatus, and K represents the pipe through which the pitch or other residue is drawn from the boiler when all volatile matter is driven off.

L represents one of the horizontal flues which pass through the boiler at the same level and alongside each other, and which are to be in contact with the surface of the material to be distilled. The boiler being properly charged and fired, the heated gases from the fire pass through the flues and around the boiler into the smoke-pipe, and the material in the boiler being heated under the pressure of the gases in the boiler, as all the stop-cocks are closed, the tarry foam on the surface of the material is destroyed by the high heat in the boiler and the flues L, with which it is in contact. It can of course easily be found out by experiments at what temperature in a given time the tarry foam will be destroyed, said temperature being indicated by the thermometer O, and O also represents a pressure-gage. As soon as the tarry foam is destroyed the stop-cock P is gradually opened and the gas in the boiler A passes through pipe H into the condensing apparatus, and the process of volatilizing all volatile matter can now be rapidly proceeded with until there remains nothing but pitch in the boiler A, which is drawn off through the cock R. Thus it will be seen that the process of volatilizing coal-tar and similar hydrocarbons can be performed in a short time without the least danger to the operatives or premises.

Instead of using a stationary boiler with flues, as described, a rotary still or boiler may be used with good advantage; but I do not confine my invention to any specific construction of boiler or still so long as pressure and a degree of heat can be applied by flues or otherwise at or near the surface of the coal-tar or other similar hydrocarbons in the boiler that will prevent the tarry foam that usually arises on the surface at the early stages of the boiling from overrunning the still or endangering the premises.

Having thus fully described the nature of my invention, what I claim therein as new, and desire to secure by Letters Patent, is—

The application of additional heat at or near the surface of the coal-tar or other similar hydrocarbon, when used in combination with pressure in the boiler, for the purpose of preventing the tarry foam from rising and overrunning the still, and thus endangering the operator as well as the premises, as herein described.

MORRIS L. KEEN.

Witnesses:
EPHRAIM MILLER,
HUGH BURGESS.